INVENTOR
THOMAS B. DOE
BY Ralph L. Tweedale
ATTORNEY

July 22, 1941.　　　　　T. B. DOE　　　　　2,249,947
POWER TRANSMISSION
Original Filed May 2, 1936　　　3 Sheets-Sheet 3
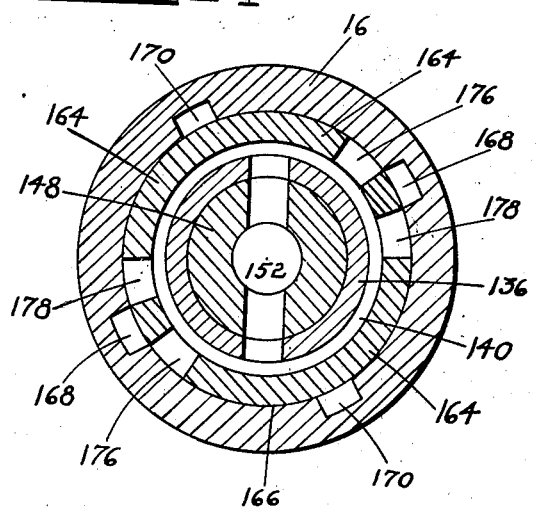
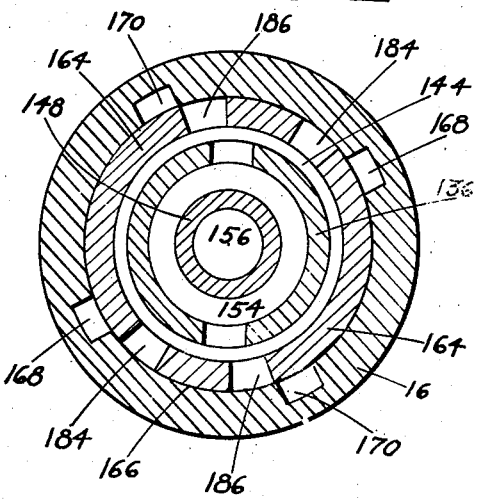
INVENTOR
THOMAS B. DOE
BY
Ralph L. Tweedale
ATTORNEY Patented July 22, 1941

2,249,947

UNITED STATES PATENT OFFICE 2,249,947

POWER TRANSMISSION

Thomas B. Doe, New York, N. Y., assignor to The Waterbury Tool Company, Waterbury, Conn., a corporation of Connecticut Application May 2, 1936, Serial No. 77,538
Renewed November 30, 1939

16 Claims. (Cl. 254—172)

This invention relates to power transmissions and more particularly to a novel power transmission device and control therefor particularly adapted to hoisting an object while relative movement between the object and the hoisting device is occurring. A device of this character is useful, for example, on ship board for the purpose of lifting floating objects such as boats, airplanes, etc., from a rough sea. The invention is shown and described as adapted for this use, although it will be understood that the invention may be used for other purposes.

In lifting floating objects from rough seas, particularly objects of a comparatively fragile character, such as a seaplane, it is necessary to insure that the means, usually a cable, which connects the object to the hoist is maintained taut at all times while the object is moved up and down relative to the hoist by the action of the waves. Unless this result is insured at all times, it is possible and frequently occurs that when the hoist is operated to lift the object out of the water, a sudden jerk is given to the object and the connecting means, which may be of sufficient magnitude to rupture the connecting means or to damage the object by pulling out the ring, or other facilities for attachment to the connecting means. Devices heretofore proposed for solving this problem, have been so constructed as to require a difficult manual operation of the controls, when changing from constant tension to hoisting, if dangerous jerks on the object are to be avoided. Furthermore, such devices under certain conditions of operation have been known to permit slack and consequent jerking to occur.

It is an object of the present invention to provide a power transmission device for driving a hoist and including control devices for preventing a sudden jerk upon the object being hoisted under any condition of operation.

A further object is to provide a control system for a device of this character by which the operation of changing over from a condition at which a predetermined tension is maintained in the hoisting connection to the condition of positive hoisting may be made without jerks by an operator at the instant when the upward speed of the object is decreasing to a value equal to the normal hoisting speed and by which it is impossible for the operator to make the change-over effective at any other instant.

A further object is to provide a device of this character with a control operable through a pilot cable which may be run adjacent to the lifting cable and by means of which an operator located at the object to be lifted may positively and easily control the movement of the empty hook toward the object to be lifted, irrespective of the relative movement between the object to be lifted and the hoisting device.

A further object is to provide a control for a device of the character described providing means for taking up slack which might occur due to wave action after hoisting is started, that is to say, to provide a control which, during hoisting, has no upper limit to the tension which may be maintained on the hoisting connection by the full weight of the object being hoisted and does not require manual operation.

Another object is to provide a device of the character described wherein a fluid power transmission is utilized for driving the hoist, which transmission includes a fluid motor of variable displacement together with control means for increasing the displacement of the motor in response to changes in pressure of the working fluid and effective only at a pressure considerably above the pressure normally maintained during constant tension operation.

A further object is to provide a device of the character described including a fluid power transmission and a control device therefor incorporating a follow-up valve by which movement and position of the fluid motor may be positively controlled.

It is also an object to provide a device of the character described including a fluid power transmission having a variable displacement pump and a valve for controlling the flow of fluid from the pump to the motor, wherein the displacement of the pump is controlled in accordance with the pressure drop across the valve.

Further objects and advantages of the present invention will be apparent from the following description, reference being had to the accompanying drawings wherein a preferred form of the present invention is clearly shown.

Figure 2:
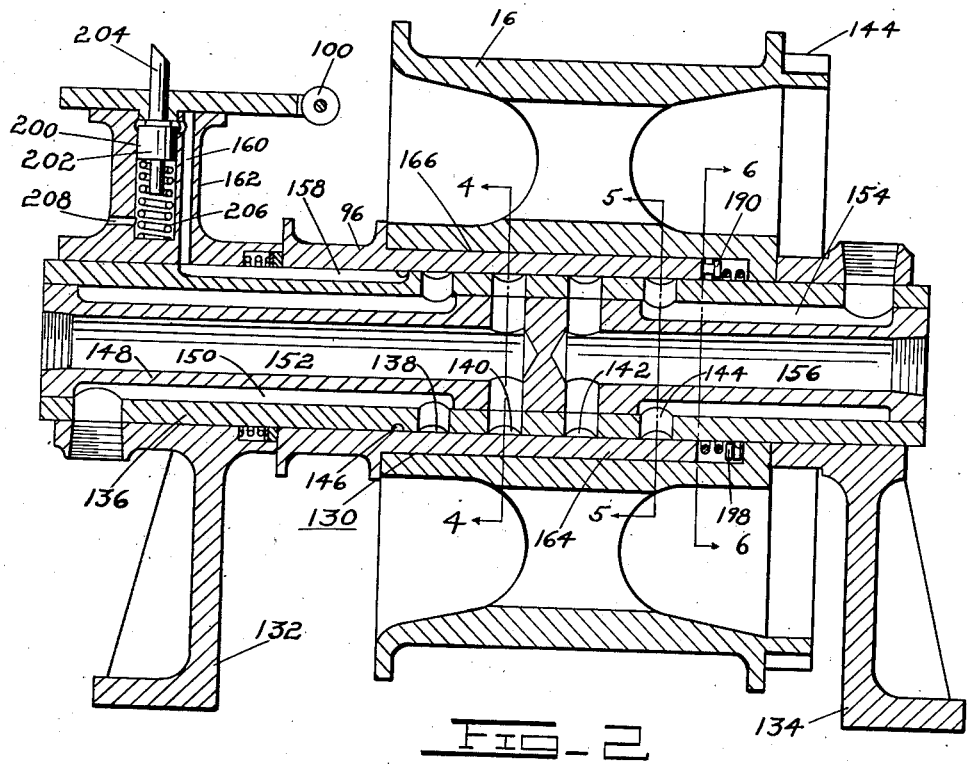
Fig. 2 is a vertical longitudinal section of the hoist drum and associated follow-up valve forming part of the device illustrated in Fig. 1.

Fig. 4 is a cross section on line 4—4 of Fig. 2.
Fig. 5 is a cross section on line 5—5 of Fig. 2.
Fig. 6 is a cross section on line 6—6 of Fig. 2.

Fig. 7 is a fragmentary sectional view on line 7—7 of Fig. 8.

Fig. 8 is a fragmentary sectional view on line 8—8 of Fig. 7.

Figure 1:
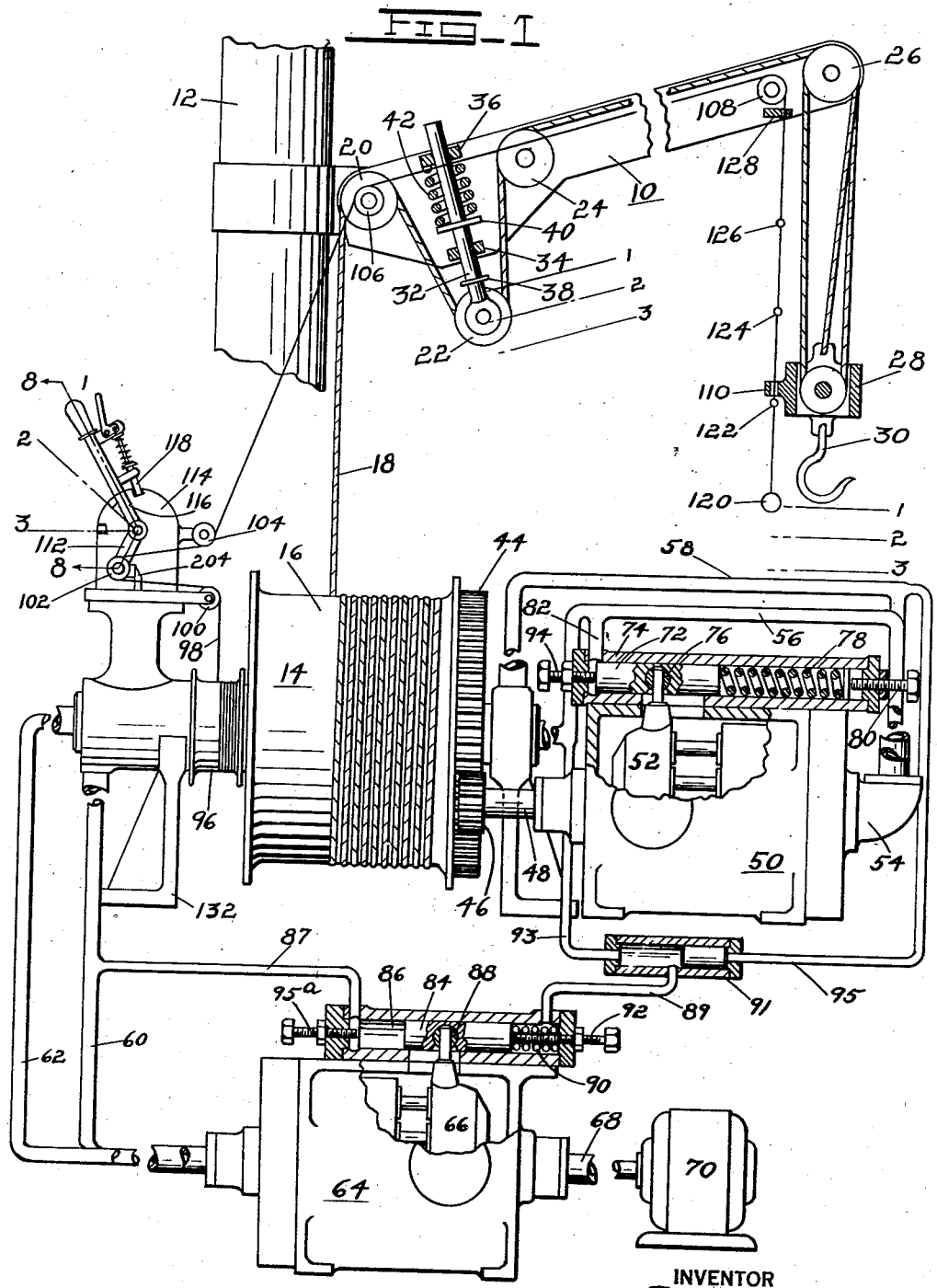
Fig. 1 is a diagrammatic view of a hoisting device embodying the present invention.

Referring now to Fig. 1 there is illustrated a hoist comprising a crane boom 10 pivotally attached to a mast 12 of a ship. A winch 14 is suitably mounted on the deck of the ship and has a drum 16 over which is wound a cable 18 forming part of a connecting means between the hoist and the object to be lifted. Cable 18 is threaded over pulleys 20, 22, 24, and 26 and through a pulley block 28 to which is attached a hook or other load attaching means 30. The pulley 22 and the bight of the cable formed by the pulleys 20, 22, and 24 forms a yielding lost-motion device between the hook 30 and the drum 16, the pulley 22 being for this purpose carried by a yoke 32 slidable in brackets 34 and 36 mounted on the boom 10. Yoke 32 carries a stop collar 38 for engagement with the bracket 34 on one side and a collar 40 for limiting the movement of the yoke in the opposite direction and for also forming an abutment for a spring 42, the other end of which abuts against the bracket 36. The pulley 22 is movable between three positions indicated as 1, 2 and 3.

The drum 16 carries a ring gear 44 which meshes with a pinion 46 carried by the shaft 48 of a variable displacement hydraulic motor 50. The motor 50 may be of the well-known "Waterbury" type which includes a tilting box 52 tiltable about a horizontal axis perpendicular to the shaft 48 for the purpose of varying the stroke of the motor pistons. The motor has a pair of supply and return connections 54 which are connected by means of conduits 56 and 58 with a follow-up valve located in the interior of the drum 16. Conduits 60 and 62 connect the opposite end of the follow-up valve with a variable displacement pump 64 which may also be of the well-known "Waterbury" type having a tilting box 66 for the purpose of varying the stroke of the pump pistons. The pump 64 has a drive shaft 68 which may be operated by a suitable constant speed prime mover such as an electric motor 70.

The tilting box of the motor 50 is provided with control means comprising a piston 72 reciprocable in a cylinder 74 and connected to the tilting box 52 by a pivoting and sliding connection at 76. A spring 78 urges the piston 72 to the left in Fig. 1 and is adjustable by means of a suitable screw 80. The left-hand end of the cylinder 74 is connected to the conduit 56 by a branch conduit 82, the conduit 56 being the supply conduit when the motor is operated to wind in cable on the drum 16 and consequently being the conduit of higher pressure when the cable 18 is under tension from a load on the hook 30. The tilting box 66 of the pump 64 is provided with control mechanism comprising a piston 84 slidable in a cylinder 86 and connected with the tilting box by a pivoting and sliding connection 88. A spring 90 urges the piston 84 to the left in Fig. 1. The left-hand end of the cylinder 86 is connected by a branch 87 to the conduit 60 while the right-hand end of the cylinder 86 is connected by a branch 89 to a shuttle valve 91, the opposite ends of which are connected to the conduits 56 and 58 by branches 93 and 95 respectively.

The tilting boxes of both the pump and the motor are illustrated as in the minimum stroke position in Fig. 1, piston 84 moving to the left to increase the stroke of the pump 64 and piston 72 moving to the right to increase the stroke of the motor 50. An adjusting screw 92 limits the minimum stroke of the pump 64 while an adjusting screw 94 limits the minimum stroke of the motor 50. In practice the minimum stroke of the pump may be adjusted to very nearly zero while the minimum stroke of the motor may be adjusted to a value in the vicinity of ten per cent of its maximum stroke. An adjusting screw 95a also permits adjustment of the maximum stroke of the pump 64 if desired.

The follow-up valve mounted within the drum 16 and described in detail hereafter comprises generally two relatively movable members, one of which moves with the drum 16 while the other moves with a pilot drum 96. The drum 96 has wound thereon a pilot cable 98 leading over pulleys 100, 102, 104, 106 and 108 to a guide hole 110 in the pulley block 28. The pulley 102 is mounted on an arm 112 which is pivotally mounted in a bracket 114 and may be operated through a lost-motion connection, later to be described, by means of a hand lever 116 to increase or decrease the length of the bight formed by the pulleys 100, 102, and 104. Hand lever 116 is movable between three positions numbered 1, 2, and 3 respectively, in any of which it may be latched by a detent 118. The ratio between the diameter of the drums 16 and 96 is made the same as the ratio between the travel of the cable 18 and the hook 30, in this case three to one.

The depending end of the pilot cable 98 carries a ring 120 by means of which the cable 98 may be operated and is also provided with limit stops 122, 124, and 126. Stop 126 is engageable with a bracket 128 mounted on the boom 10 for limiting the upward travel of the cable 98 relative to the boom 10. The stop 124 limits the downward travel of the cable 98 relative to the pulley block 28 while the stop 122 limits the upward travel of cable 98 relative to the pulley block 28. The ring 120 is movable relative to the block 28 between three positions indicated as 1, 2, and 3, respectively.

Referring now to Figs. 2 to 6 inclusive the internal construction of the drum 16 and the follow-up valve generally designated as 130 is there illustrated. Two pedestals 132 and 134 support between them a stationary, tubular supporting shaft 136 which is provided with a plurality of circumferential grooves 138, 140, 142, 144 and 146 by which fluid connection to the movable members of the follow-up valve is established. In the interior of the tubular member 136 is mounted a divider sleeve member 148 forming at one end an annular passage 150 communicating with the groove 138 and a central passage 152 communicating with the groove 140, and at the other end similar passages 154 and 156 communicating with the grooves 144 and 142, respectively. The passages 150, 152, 154 and 156 communicate with conduits 60, 62, 58 and 56 respectively. The groove 146 communicates by means of a longitudinal groove 158 with a bore 160 formed in the support 162 for the bracket 114 for a purpose later to be described. Rotatably mounted on the cylindrical outer surface of the support 136 is a tubular sleeve 164 which may be formed integrally with the pilot cable drum 96 and which forms one member of the follow-up valve 130. The drum 16 is provided with a bore 166 surrounding the outer surface of the sleeve 164 and which forms the other member of the follow-up valve 130.

Figure 3:
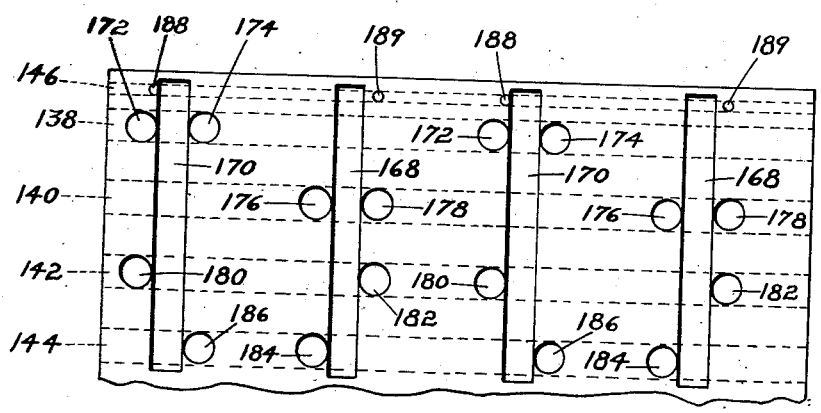
Fig. 3 is a developed view of the cylindrical surface of a portion of the follow-up valve shown in Fig. 2.

The interior of the bore 166 is provided with two pairs of diametrically opposite, longitudinally extending grooves 168 and 170 (see Fig. 3). The valve member 164 is formed with a plurality of holes communicating between the various circumferential grooves 138, 140, 142, 144, and 146 and the longitudinal grooves 168 and 170. The lay-out of these holes is illustrated in Fig. 3 as a development of the cylindrical surface of the bore 166 looking from the outside thereof inwardly. These holes are arranged in diametrically opposite pairs in order to balance the valve hydraulically. Thus, holes 172 communicate between the groove 138 and one edge of the grooves 170. Holes 174 communicate between the groove 138 and the opposite edge of the grooves 170. Holes 176 communicate between the groove 140 and one edge of the grooves 168. Holes 178 communicate between the groove 140 and the opposite edge of the grooves 168. Holes 180 communicate between the groove 142 and one edge of the grooves 170. Holes 182 communicate between the groove 142 and the opposite edge of the grooves 168. Holes 184 communicate between groove 144 and one edge of grooves 168, while holes 186 communicate between the groove 144 and the opposite edge of grooves 170. Holes 188 communicate between the groove 146 and one edge of the groove 170 and holes 189 communicate between groove 146 and the opposite edge of grooves 168. The spacing between the edges of the grooves and the adjacent edges of the holes may be varied within reasonable limits to provide more or less overlap as desired.

The amount of relative motion between the valve members 164 and 166 is limited by the mechanism illustrated in Fig. 6. The right-hand end of the bore 166 is sufficiently long to provide space for a motion limiting mechanism which comprises a headed pin 190 fastened in the inner end of the valve member 164 which is movable between a pair of stop pins 192 and 194 secured in the hub of the drum 16 and projecting within the bore 166 adjacent the head of the pin 190. A spring 196 has one end hooked on the pin 190 and its opposite end hooked on a pin 198 fastened in the end of the bore 166 for the purpose of constantly urging the pin 190, the valve member 164 and the pilot drum 96 counter-clockwise in Fig. 6 relative to the drum 16 and thus maintaining the pilot cable taut at all times.

In operation of the follow-up valve when the parts are in the position illustrated, both the supply and return conduits 60 and 62 are cut off from the conduits 56 and 58. If the member 164 is turned clockwise in Fig. 4 or to the right in Fig. 3 such as would occur with the end of the cable 98 moved upwardly permitting spring 196 to wind cable on the drum 96; holes 172 open to the grooves 170 and holes 176 open to the grooves 168. The grooves 168 and 170 are thereby connected to the conduits 62 and 60 respectively. Concurrently the holes 184 open to the grooves 168 and holes 180 open to the grooves 170. The grooves 168 and 170 are thereby also connected to the conduits 58 and 56 respectively. Fluid is thus permitted to pass from the pressure line 60 to the conduit 56 and return from the conduit 58 to the return line 62. The amount of opening is dependent upon the amount of relative movement between the drum 96 and the drum 16.

As soon as the follow-up valve begins to pass fluid to the hoist motor 50, the drum 16 begins to turn and tends to close off the valve openings in the follow-up valve 130 unless the drum 96 be rotated ahead of the drum 16 at the same speed. It will thus be seen that drum 16 will be caused to follow the movements of the pilot drum 96 and that as fast as the drum 96 is turned in the direction to wind cable thereon, the valve 130 is opened to operate the motor in proportion to the very slight lag of the motor movements behind the movements of the pilot drum 96. As soon as the pilot drum 96 is stopped, a small continued movement of the motor 50 moves the drum 16 to close the valve 130. In the opposite direction of movement the action is identical to that previously described except that the grooves 168 and 170 are placed in communication with the other set of holes in the valve member 164 and thus connect the motor 50 for rotation in the opposite direction.

Upon movement of the valve member 164 clockwise in Fig. 4 or to the right in Fig. 3 relative to the drum 16, the holes 188 also open communication between the grooves 170 and the circumferential groove 146. The location of the holes 172, 188 and 189 is preferably such that with the valve 130 standing in neutral position as illustrated in Fig. 3, a slight opening exists between the holes 172 and 188 and the grooves 170 while there is a corresponding space between the edge of holes 189 and grooves 168. The groove 146 communicates through the passages 158 and 160 with the top end of a cylinder bore 200 formed in the support 162. Within the cylinder is reciprocably mounted a piston 202 carrying a latch 204 adapted to stand in the path of the arm 112 on the bracket 114 in the position illustrated in Fig. 1. A spring 206 yieldably urges the piston 202 upwardly in the absence of fluid pressure at the top of the cylinder 200, a vent 208 being provided at the bottom of the cylinder 200.

The arm 112 is connected to the operating lever 116 through a lost-motion connection shown in Figs. 7 and 8. Thus, the arm 112 is provided with a bore 210 embracing a hub 212 of the arm 116. Bore 210 is provided with an enlarged segmental portion 214 within which a projection 216 on the hub 212 may partake of limited angular movement equal to the angle between positions 1 and 3 of lever 116. A spring 218 urges the members into the relative position illustrated in Fig. 7 with sufficient force to overcome the spring 196 acting through the cable 98. The lever 116 and the arm 112 normally move as a unit on a stationary shaft 220. When the latch 204 is in the upper position illustrated, however, if the hand lever 116 be moved counter-clockwise into number 2 or number 3 position, the latch prevents movement of the arm 112 until such time as fluid pressure admitted through the conduit 160 retracts the latch 204 so that arm 112 can then partake of any movement initially given to the lever 116.

In the operation of the device as a whole the motor 70 is placed in operation and the block 28 is normally raised adjacent the end of the boom, the takeup spring 196 and the follow-up valve 130 maintaining the cable 98 with its stop 126 abutting the bracket 128.

When it is desired to lift a seaplane floating alongside a ship (the ship and the plane being either traveling through the water at the same rate or both standing still except for wave movements), a light throwing line is attached to the ring 120 and thrown overboard to the pilot of the seaplane. The control lever 116 should at this time be latched in position number 1. As soon as the operator aboard the seaplane begins pulling the throwing line to pull the cable 98 downwardly, the pilot drum 96 is rotated in a direction to cause the drum 16 to unreel the main cable 18. It will be seen that the hook 30 under these conditions will follow the movements of the cable 98 relative to the operator aboard the seaplane, even though the movements imparted to the plane and to the boom 10 due to the waves, may at times produce a resultant movement of the cable 98 relative to the boom 10 in the opposite direction to the movement of the cable 98 relative to the operator. Thus if the operator were pulling the cable 98 downwardly at a given speed and a wave were moving the plane upwardly at double that speed, the resultant movement of the cable 98 relative to the boom 10 is upward at half the speed of the upward movement of the plane. Since the hook 30 follows the movements of cable 98 relative to the boom 10, the hook will move upwardly at half the plane's upward speed and the movement of the hook toward the operator on the plane will then be downwardly at the same speed at which the cable 98 is being pulled toward the plane.

The operator is thus able to easily bring the hook downwardly toward the plane as fast as he wishes until it is below the ring or other attaching means by which the plane is to be lifted. The operator may then let the cable 98 move upwardly relative to the plane to engage the hook with the ring, the upward movement being limited by the limit stop 122 engaging the block 28. As soon as the hook engages the ring or is so close to engagement as to make its engagement certain, the operator may preferably completely release the cable 98.

During these operations the lost-motion pulley 22 was fully extended in position number 3 due to the absence of weight on the hook 30. As soon as the weight of the plane begins to come on to the hook 30, the pulley 22 is drawn upwardly into substantially position number 2. In so moving, relative movement is caused between the drums 96 and 16 due to the fact that the cable 98 is not threaded over the pulley 22 and that the continued winding in of the cable 18 instead of moving the hook 30 upwardly shortens the bight of cable around the pulley 22, thus causing the drum 16 to move ahead of the drum 96 and so close the follow-up valve 130. Thus, as soon as a predetermined tension is reached on the cable 18, the pulley 22 is brought into position number 2 and drum 16 is brought to rest by the concurrent closing of the follow-up valve 130. In a rough sea the pulley 22 will thereafter be constantly moving in the vicinity of position number 2, causing relative movement between the drums 96 and 16 sufficient to make the hook 30 follow the wave movements and maintain substantially constant tension on the cable 18. Likewise, it will be noted that the lost-motion device associated with pulley 22 acts, in addition to its function of controlling valve 130, to take up or pay out small amounts of cable without lag of any kind. This is particularly useful in compensating for small movements of the plane relative to the ship such as are caused by small waves which may be superimposed on the larger "swells." It is preferred to proportion the travel of the pulley 22, the rate and length of spring 42, and the travel of valve 130 so that the pulley 22 can take up or pay out the largest amount of cable ever required during the small interval required for the speed of drum 16 to catch up with the speed of drum 96.

When it is desired to lift the plane from the water, the lever 116 is manually moved from position number 1 to position number 3. If at the instant lever 116 is moved, the plane should be traveling downwardly relative to the boom, the latch 204 will stand in the upper position illustrated under the urge of spring 206 due to lack of fluid pressure in the passage 160. The movement of the lever 116 is thus taken up in the lost-motion mechanism 214, 216 and the spring 218 is additionally flexed. As soon as the plane starts upwardly the drum 96 is moved ahead of the drum 16 in the winding up direction and pressure fluid is admitted to the conduit 160 thus retracting the latch 204 and permitting arm 112 to move to the right into the position corresponding to the position of the lever 116. The follow-up valve is thus opened wide in the hoisting direction and as soon as the upward speed of the plane relative to the boom falls off to the value at which hoisting normally takes place, the tension on cable 18 increases and the pulley 22 is moved upwardly to position number 1.

In making this transition from constant tension operation to hoisting operation, it will be noted that the bight in the pilot cable formed by the pulley 102 was decreased by two steps; that is, lever 116 and arm 112 move from position number 1 to position number 3. The bight in the main cable 18 is decreased by only one step, however, when the full weight of the plane comes on the cable 18 so that the resulting relative position between drum 96 and drum 16 is with the drum 96 one step ahead of the drum 16 in the hoisting direction.

As soon as the full weight of the plane comes on the hook, the tension increases to a value several times larger than that maintained during constant tension operation so that the piston 72 is forced to the right under the higher pressure now existing in the conduit 56 and the displacement of the motor 50 is thus increased to its maximum value. The speed of the hoist is thereby decreased so that the pump 64 may operate at substantially full stroke and still be able to lift the full weight of the plane without overloading the motor 70.

The plane is thus raised at a slower constant speed and may be stopped when it has been hoisted to sufficient height by moving lever 116 to position number 2. It may also be stopped by the operator aboard the plane by pulling down the ring 120 to position number 2. Movement of the lever 116 to position number 1 causes the drum 16 to operate in the opposite direction lowering the plane on to the deck of the ship. The boom 10 having been swung inwardly, the plane comes to rest on the deck and the hoist stops as soon as the tension is relieved to the value maintained while the plane floats alongside the ship. The hook may be released by the operator on the plane operating the pilot cable 98 to further lower the hook 30.

In order to more clearly understand the conditions of operation, the following table illustrates the effects produced by the three controls 120, 22 and 116 under various conditions. If the indicated positions of these parts be considered as numerical values, then the position of the control 120 subtracted from the sum of the positions of 22 and 116 will indicate the relative position of the two members of the follow-up valve 130. Thus, if this quantity is 1, the valve 130 will be set to lower; if it is 2, the valve will be set in neutral or closed position; if it is 3, the valve will be set to hoist. The table indicates these values together with numerical examples of the tension which may be maintained on the cable 18 under these conditions.

| Operation | Tension | 120 | 22 | 116 | 22+116−120 |
|---|---|---|---|---|---|
| Idle | 0 | 2 | 3 | 1 | 2 |
| Lower light | 0 | 3 | 3 | 1 | 1 |
| Hoist light | 0 | 1 | 3 | 1 | 3 |
| Constant tension | 500 | 1 | 2 | 1 | 2 |
| Hoist loaded | 5,000 | 1 | 1 | 3 | 3 |
| Stop loaded | 5,000 | 1 | 1 | 2 | 2 |
| Lower loaded | 5,000 | 1 | 1 | 1 | 1 |
| Set down | 500 | 1 | 2 | 1 | 2 |
| Lower light | 0 | 3 | 3 | 1 | 1 |
| Stop lowering | 0 | 2 | 3 | 1 | 2 |

The effect of other possible positions of the control not indicated in the table may be easily determined by the same calculation of the sum of the positions of 22 and 116 minus the position of 120. While the three control members 22, 116 and 120 have for convenience been considered as movable between certain definite positions it will be understood that each may occupy any position whatever between the extreme positions and that the follow-up valve will be opened to a corresponding degree as soon as the motor speed picks up to the speed of movement of the pilot cable 98. Thus, it is possible by manual operation, in the case of controls 116 and 120, and automatically, in the case of the control 22, to produce any speed of the drum desired within the capacity of the hydraulic transmission. This is particularly apparent in the control 116 which operates as a proportional control; that is, the speed of operation of the drum is proportional to the displacement of the lever 116 away from position number 2, for example, when control 22 is at position number 1 and control 120 is at position number 1.

It will be noted that during hoisting of the plane, the follow-up valve 130 is wide open in the direction for winding in cable on the drum 16. Should a larger wave or roll of the ship cause the plane to be again raised relative to the boom after hoisting has begun, the tension will be relieved on the cable 18 and although the pulley 22 will move downwardly it can have no beneficial effect upon the follow-up valve since it is already fully open in hoisting position. Under these conditions the pressure is relieved on the piston 72 and the motor 50 is thus brought to minimum displacement, thus keeping the speed of the hoist up to the value necessary to maintain as a minimum the tension maintained during constant tension operation. Preferably the value of cable tension at which the piston 72 begins to decrease the stroke of the motor 50 is somewhat higher than that maintained during constant tension operation.

At all times during operation of the hoist the stroke and consequently the displacement of the pump 64 is automatically regulated to correspond with the quantity of fluid required by the valve opening at follow-up valve 130. Thus, when the valve 130 is closed, the pressure is built up in line 60 to force the piston 84 to the right and move the tilting box 66 into no stroke position. As soon as fluid is required by a given opening of the valve 130, the spring 90 moves the piston 84 to the left until the stroke has been increased sufficiently to maintain a predetermined small pressure drop between conduit 60 and conduit 56 or 58, depending upon the direction of operation of drum 16.

While the form of embodiment of the invention as herein disclosed, constitutes a preferred form, it is to be understood that other forms might be adopted, all coming within the scope of the claims which follow. It will also be understood that where the claims define an object subject to varying external forces counteracting the pull (of the device) that this and similar expressions refer to conditions not only where the external forces are acting in a direction opposite to the pull of the device on the object but also where the external forces may be, at least at times, of opposite sign and assisting the pull of the device.

What is claimed is as follows:

1. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operable for causing the winch to positively haul in the object at a predetermined speed, and means responsive to the speed of rotation of the winch for controlling effective operation of the last mentioned means.

2. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operable for causing the winch to positively haul in the object at a predetermined speed, and a detent automatically operated in accordance with the speed of the winch for preventing operation of said means until the speed of the object is equal to the normal hauling in speed.

3. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operable for causing the winch to positively haul in the object at a predetermined speed, a latch for preventing movement of said means, and fluid pressure operated means for retracting said latch when the speed of the winch is equal to the normal hauling in speed.

4. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operable for causing the winch to positively haul in the object at a predetermined speed, a latch for preventing movement of said means, and means operating to retract said latch when the speed of the winch is equal to the normal hauling in speed.

5. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operable for causing the winch to positively haul in the object at a predetermined speed, a latch for preventing movement of said means, and means operating to retract said latch in response to a predetermined relative movement between the object and the winch.

6. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member directly connected to the drum and a second member movable over a limited range relative to the first member and means for imparting to said second member motion corresponding to that desired for the winch drum, said follow-up valve being positioned within the drum and coaxial therewith.

7. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member directly connected to the drum and a second member movable over a limited range relative to the first member and means for imparting to said second member motion corresponding to that desired for the winch drum, and means for varying the pump displacement in accordance with the pressure drop across the follow-up valve, said follow-up valve being positioned within the drum and coaxial therewith.

8. In a cable winding winch operating system the combination of a winch drum, a fluid motor operatively connected to the drum, a variable displacement fluid pump, fluid supply and return conduits connecting the pump and motor, a follow-up valve for controlling said conduits, said valve comprising a first member movable in accordance with movements of the drum and a second member movable over a limited range relative to the first member and means for imparting to said second member motion corresponding to that desired for the winch drum, said follow-up valve being within the drum and coaxial therewith.

9. In a device for pulling on an object while subject to varying external forces counteracting the pull the combination of a winch, a fluid motor for driving the winch and having means for varying its displacement in infinitely small increments, a fluid pump connected to operate the motor, said motor and pump constituting a variable speed hydraulic transmission, a prime mover for driving the pump, means responsive to the pressure of the working fluid for operating the motor displacement varying means toward increased displacement upon a rise in pressure, means connected with said transmission to maintain a substantially constant light pulling force on the object while it is subject to varying external forces and means also connected with said transmission for causing the object to be hauled in, said motor displacement remaining fixed at a minimum value during the maintenance of the light pulling force on the object.

10. In a device for pulling on an object while subject to varying external forces counteracting the pull the combination of a winch, a fluid motor for driving the winch and having means for varying its displacement in infinitely small increments, a fluid pump connected to operate the motor, said motor and pump constituting a variable speed power transmission, a prime mover for driving the pump, control means connected with said transmission and effective either to maintain a substantially constant light pulling force on the object or to positively haul in the object, and pressure responsive control means for the motor displacement varying means effective to increase the motor displacement only in response to the imposition on the winch of the full load of the object being hauled in.

11. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, a single manually operable member and connections between said member and said variable speed means for causing the winch to positively pull in the object irrespective of load and for varying the speed and direction of operation of the winch thereafter.

12. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, a single manually operable member and connections between said member and said variable speed means for causing the winch to positively pull in the object irrespective of load and for varying the speed and direction of operation of the winch thereafter, and means for preventing effective operation of said member until the automatic means has reduced the speed to said predetermined hauling in speed.

13. In a device for pulling on an object while subject to varying external forces counteracting the pull the combination of a winch, variable speed fluid power transmission means for driving the winch, automatic means responsive to load on the winch for varying the speed and direction of the driving means to maintain a substantially constant, light load on the winch, a single manually operable member and connections between said member and said variable speed means for causing the winch to positively pull in the object irrespective of load and for varying the speed and direction of operation of the winch thereafter.

14. In a device for pulling on an object while subject to varying external forces counteracting the pull the combination of a winch, variable speed fluid power transmission means for driving the winch, automatic means responsive to load on the winch for varying the speed and direction of the driving means to maintain a substantially constant, light load on the winch, a single manually operable member and connections between said member and said variable speed means for causing the winch to positively pull in the object irrespective of load and for varying the speed and direction of operation of the winch thereafter, and means for preventing effective operation of said member until the automatic means has reduced the speed to said predetermined hauling in speed.

15. In a device for pulling on an object while subject to varying external forces counteracting the pull the combination of a winch, variable speed means for driving the winch, automatic means responsive to load on the winch for varying the speed and direction of the driving means to maintain a substantially constant, light load on the winch, means operably connected to the variable speed means and operable for causing the winch to positively pull in the object at a predetermined pulling speed, and means for delaying effective operation of said last means to start positive pulling until the automatic means has reduced the speed to said predetermined pulling speed.

16. In a device for pulling on an object while subject to varying external forces counteracting the pull the combination of a winch, variable speed fluid power transmission means for driving the winch, automatic means responsive to load on the winch for varying the speed and direction of the driving means to maintain a substantially constant, light load on the winch, means operably connected to the variable speed means and operable for causing the winch to positively pull in the object at a predetermined pulling speed, and means for delaying effective operation of said last means to start positive pulling until the automatic means has reduced the speed to said predetermined pulling speed.

THOMAS B. DOE.